(12) United States Patent
Lu et al.

(10) Patent No.: US 12,322,180 B2
(45) Date of Patent: Jun. 3, 2025

(54) IMAGE SHOOTING METHOD AND ELECTRONIC DEVICE FOR VIDEO GENERATION

(71) Applicant: VIVO MOBILE COMMUNICATION CO., LTD., Guangdong (CN)

(72) Inventors: Peirui Lu, Guangdong (CN); Meimei Cai, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 353 days.

(21) Appl. No.: 17/949,486

(22) Filed: Sep. 21, 2022

(65) Prior Publication Data
US 2023/0013753 A1  Jan. 19, 2023

Related U.S. Application Data

(63) Continuation of application No. PCT/CN2021/081982, filed on Mar. 22, 2021.

(30) Foreign Application Priority Data

Mar. 27, 2020  (CN) .......................... 202010228177.2

(51) Int. Cl.
*G06V 10/60* (2022.01)
*G06T 5/50* (2006.01)
(Continued)

(52) U.S. Cl.
CPC ................ *G06V 20/46* (2022.01); *G06T 5/50* (2013.01); *G06T 7/20* (2013.01); *G06T 7/33* (2017.01);
(Continued)

(58) Field of Classification Search
None
See application file for complete search history.

(56) References Cited

U.S. PATENT DOCUMENTS

2005/0195899 A1* 9/2005 Han ................... H04N 21/2662
375/240.18
2010/0020233 A1* 1/2010 Ueno ................... H04N 7/0132
348/E7.003
(Continued)

FOREIGN PATENT DOCUMENTS

CN  1756312 A  4/2006
CN  101431616 A  5/2009
(Continued)

*Primary Examiner* — Akwasi M Sarpong
*Assistant Examiner* — Pawan Dhingra
(74) *Attorney, Agent, or Firm* — Price Heneveld LLP (57) ABSTRACT

The present invention provides an image shooting method and an electronic device. The image shooting method includes: receiving a first input; in response to the first input, obtaining a first video stream and a second video stream with a same shot content acquired by a camera module; extracting a target object in the shot content of the first video stream to obtain a first intermediate video stream of the target object; removing the target object in the shot content of the second video stream and performing image registration compensation on areas at which the target object is located, to obtain a second intermediate video stream; and generating, based on the first intermediate video stream and the second intermediate video stream, a target video; where the first intermediate video stream and the second intermediate video stream are different in frame rate.

9 Claims, 3 Drawing Sheets

(51) Int. Cl.
  *G06T 7/20* (2017.01)
  *G06T 7/33* (2017.01)
  *G06T 7/70* (2017.01)
  *G06V 20/40* (2022.01)
  *H04N 7/01* (2006.01)

(52) U.S. Cl.
  CPC ............... *G06T 7/70* (2017.01); *G06V 10/60* (2022.01); *H04N 7/0127* (2013.01); *G06T 2207/20221* (2013.01); *G06V 2201/07* (2022.01)

(56) References Cited

U.S. PATENT DOCUMENTS

| | | | |
|---|---|---|---|
| 2010/0119156 A1* | 5/2010 | Noguchi | H04N 19/61 382/285 |
| 2012/0314104 A1* | 12/2012 | Nishiyama | H04N 23/676 348/241 |
| 2017/0316270 A1* | 11/2017 | Chen | G06V 20/46 |
| 2019/0103136 A1* | 4/2019 | Liu | H04N 5/77 |
| 2022/0301180 A1* | 9/2022 | Wang | G06T 3/4038 |
| 2023/0013753 A1* | 1/2023 | Lu | H04N 23/951 |

FOREIGN PATENT DOCUMENTS

| | | | | |
|---|---|---|---|---|
| CN | 101652994 A | | 2/2010 | |
| CN | 102724503 A | * | 10/2012 | |
| CN | 104754200 A | | 7/2015 | |
| CN | 104954689 A | | 9/2015 | |
| CN | 105554361 A | | 5/2016 | |
| CN | 105847636 A | * | 8/2016 | ............ H04N 5/222 |
| CN | 106131449 A | | 11/2016 | |
| CN | 106791416 A | | 5/2017 | |
| CN | 107018331 A | | 8/2017 | |
| CN | 107592488 A | | 1/2018 | |
| CN | 109361879 A | | 2/2019 | |
| CN | 109819161 A | | 5/2019 | |
| CN | 110675420 A | | 1/2020 | |
| CN | 111405199 A | | 7/2020 | |
| JP | 2003125369 A | | 4/2003 | |
| JP | 2009049979 A | | 3/2009 | |
| JP | 2011193117 A | | 9/2011 | |
| JP | 2014030095 A | | 2/2014 | |
| JP | 2017538331 A | | 12/2017 | |
| KR | 20080023604 A | | 3/2008 | |
| KR | 20140003116 A | | 1/2014 | |
| WO | WO-2021190428 A1 | * | 9/2021 | ............ G06T 5/50 |

* cited by examiner

IMAGE SHOOTING METHOD AND ELECTRONIC DEVICE FOR VIDEO GENERATION

CROSS-REFERENCE TO RELATED APPLICATIONS

This application is a continuation application of PCT International Application No. PCT/CN2021/081982 filed on Mar. 22, 2021, which claims priority to Chinese Patent Application No. 202010228177.2, filed in China on Mar. 27, 2020, which are incorporated herein by reference in their entireties.

TECHNICAL FIELD

The present invention relates to the field of communications technologies, and in particular, to an image shooting method and an electronic device.

BACKGROUND

At present, for a video shot by an electronic device, processing such as editing and adding a simple special effect can be directly implemented on the electronic device, but it is not so easy for a user to achieve some more complex video effects in the same way.

For example, for special effects involving video compositing, it is often necessary to first copy an original video, then manually adjust the copied video step by step using software. Such operations are cumbersome and inefficient, and take up a lot of computing resources, inconvenient for a user to process the video quickly.

SUMMARY

The present invention provides an image shooting method and an electronic device, so as to resolve problems in the prior art that operations are cumbersome and a lot of resources are taken up when an electronic device is performing special effect processing on a video.

To resolve the foregoing technical problems, the present invention is implemented as follows.

According to a first aspect, an embodiment of the present invention provides an image shooting method, applied to an electronic device and including:

receiving a first input;
in response to the first input, obtaining a first video stream and a second video stream with a same shot content acquired by a camera module;
extracting a target object in the shot content of the first video stream to obtain a first intermediate video stream of the target object;
removing the target object in the shot content of the second video stream and performing image registration compensation on areas at which the target object is located, to obtain a second intermediate video stream; and
generating, based on the first intermediate video stream and the second intermediate video stream, a target video; where
the first intermediate video stream and the second intermediate video stream are different in frame rate.

According to a second aspect, an embodiment of the present invention provides an electronic device, including:

a receiving module, configured to receive a first input;
an obtaining module, configured to: in response to the first input, obtain a first video stream and a second video stream with a same shot content acquired by a camera module;
a first processing module, configured to extract a target object in the shot content of the first video stream to obtain a first intermediate video stream of the target object;
a second processing module, configured to remove the target object in the shot content of the second video stream and perform image registration compensation on areas at which the target object is located, to obtain a second intermediate video stream; and
a compositing module, configured to generate, based on the first intermediate video stream and the second intermediate video stream, a target video; where
the first intermediate video stream and the second intermediate video stream are different in frame rate.

According to a third aspect, an embodiment of the present invention provides an electronic device, including a processor, a memory, and a computer program stored in the memory and capable of running on the processor, where when the computer program is executed by the processor, the steps of the foregoing image shooting method are implemented.

According to a fourth aspect, an embodiment of the present invention provides a computer-readable storage medium, where the computer-readable storage medium stores a computer program, and when the computer program is executed by a processor, the steps of the foregoing image shooting method are implemented.

According to a fifth aspect, an embodiment of the present invention provides a computer software product, where the computer software product is stored in a non-volatile storage medium, and the software product is configured to be executed by at least one processor to implement the steps of the foregoing image shooting method.

According to a sixth aspect, an embodiment of the present invention provides an electronic device, where the electronic device is configured to execute the foregoing image shooting method.

In the embodiments of the present invention, a first input is received; in response to the first input, a first video stream and a second video stream with a same shot content acquired by a camera module are obtained; a target object in the shot content is extracted from the first video stream and removed from the second video stream to obtain a first intermediate video stream and a second intermediate video stream respectively; and finally compositing is performed on the first intermediate video stream and the second intermediate video stream which are different in frame rate to generate a target video. In this way, video special effects processing can be quickly implemented when videos are shot, allowing personalized video shooting and improving user shooting experience.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

To make the to-be-resolved technical problems, technical solutions, and advantages of the present invention clearer, the following provides detailed descriptions with reference to the accompanying drawings and specific embodiments.

Figure 1:
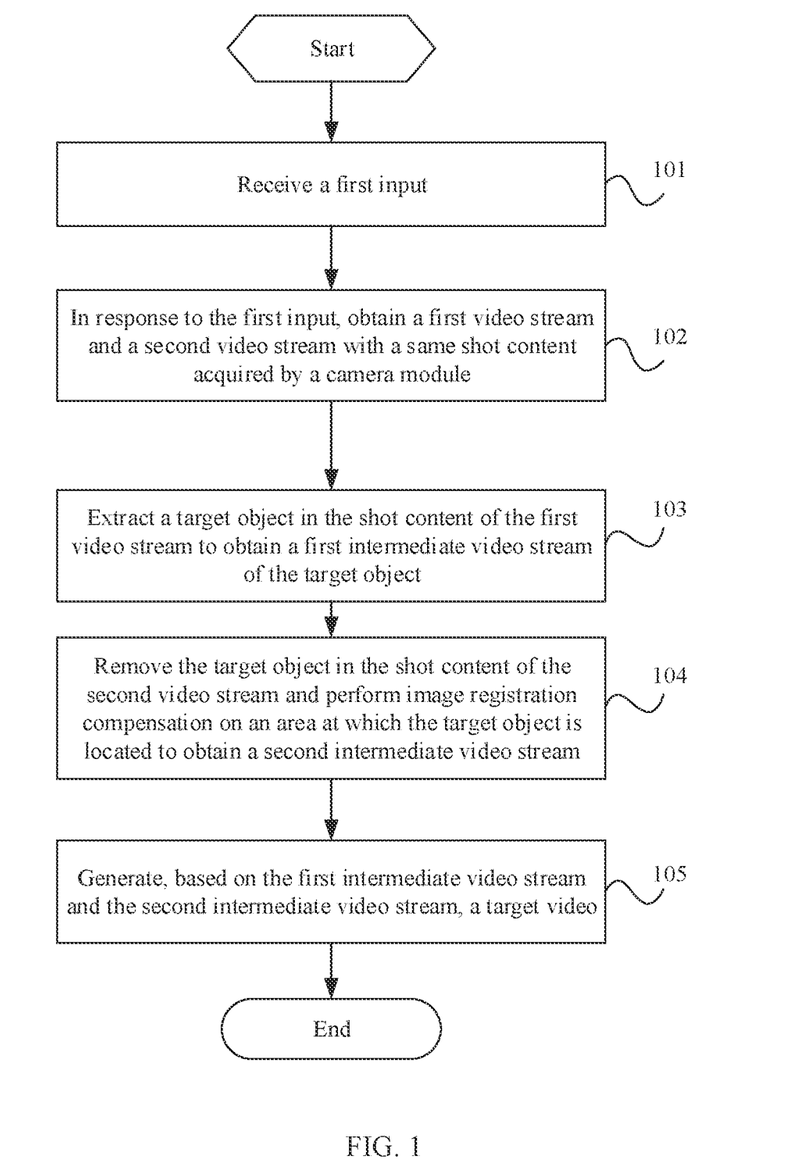
FIG. 1 is a schematic flowchart of an image shooting method according to an embodiment of the present invention.

FIG. 1 is a schematic flowchart of an image shooting method according to an embodiment of the present invention. This embodiment of the present invention provides an image shooting method, applied to an electronic device with an image shooting function. The image shooting method in this embodiment of the present invention may include the following steps.

Step 101. Receive a first input.

In this embodiment of the present invention, a user may perform a first input operation to make the electronic device receive the first input, then control the electronic device to start a camera module to perform a shooting action, and trigger the electronic device to implement a processing operation in a preset video shooting mode.

Optionally, the first input is used to trigger a shooting command of the preset video shooting mode. The first input may include at least one of audio input, body movement input, touch input acting on the electronic device, and motion input acting on the electronic device. The body movement input may include but is not limited to at least one of a gesture movement input, a head movement input, and a facial movement input. The touch input acting on the electronic device may include but is not limited to a touch input acting on a screen or case. The motion input acting on the electronic device may include but is not limited to at least one of a swing action input, a flip action input, which act on the electronic device, and a curving input/a bending input acting on a flexible screen. For example, the preset video shooting mode may be a funny recording mode or a special effect video shooting mode.

Step 102. In response to the first input, obtain a first video stream and a second video stream with a same shot content acquired by a camera module.

In this embodiment of the present invention, in response to step 101 of receiving a first input, the electronic device obtains a first video stream and a second video stream acquired by a camera module during a process of shooting a same content. In this case, the first video stream and the second video stream have the same shot content.

Optionally, the first video stream and the second video stream may be acquired by camera modules at the same time. The first video stream and the second video stream may be acquired by using a same camera module, and in this case, the camera includes a first analog-to-digital converter (ADC) and a second ADC. When acquiring the shot content, the camera converts a same photon into two electrical signals by using the first ADC and the second ADC respectively, and outputs the electrical signals at the same time to form two video streams, which are the first video stream and the second video stream. The shot content has different brightness levels in the two video streams formed through conversion by the first ADC and the second ADC.

To help better highlight the target object in a generated target video, the shot content uses different brightness in the first video stream and the second video stream. For example, the shot content is brighter in the first video stream, and darker in the second video stream, which also means that the first intermediate video including the target object is brighter, and the second intermediate video stream including content other than the removed target object is darker. In this case, to ensure output efficiency and shooting effect of the two video streams, the camera including the first ADC and the second ADC can be used to acquire the first video stream and the second video stream at the same time.

More preferably, the first video stream and the second video stream can be acquired by a same camera, and the shot content corresponds to a same camera site and a same exposure time in the first video stream and the second video stream, helping reduce difference between the two video streams to achieve a better video effect. As described above, if the camera including the first ADC and the second ADC is used to acquire the first video stream and the second video stream at the same time, the two video streams are the same in both camera site and exposure time and different only in exposure intensity. In this way, for extracting or removing the target object, the target object only needs to be identified in one video stream, and extracting or removing processing on the other video stream can be performed according to identified locations. The two video streams are different in exposure intensity so that a finally generated target video may have an assured good light and dark contrast effect.

In addition, in this embodiment of the present invention, while acquiring, the electronic device can output at least one of the first video stream or the second video stream to display as preview screens. For example, in a case that the shot content has different brightness in the first video stream and the second video stream, the electronic device may output a video stream with brighter shot content in the first video stream and the second video stream to display as preview screens.

It can be understood that in this embodiment of the present invention, a video stream acquired and output by the camera module is not limited, which means that the video stream obtained by the electronic device is not limited in video frame rate and video resolution, which can be set according to actual configuration parameters of the camera module of the electronic device and user configuration requirements. For example, the video frame rate and the video resolution of the video stream obtained by the electronic device are respectively 120 fps and 1080P by default.

Step 103. Extract a target object in the shot content of the first video stream to obtain a first intermediate video stream of the target object.

In this embodiment of the present invention, the electronic device may extract the target object in the shot content of the first video stream obtained in step 102 from the shot content to obtain a first intermediate video stream including the target object. In this case, the first intermediate video steam may include only the target object. Optionally, the electronic device may extract the target object in the first video stream frame by frame.

Step 104. Remove the target object in the shot content of the second video stream and perform image registration compensation on areas at which the target object is located, to obtain a second intermediate video stream.

In this embodiment of the present invention, the electronic device may remove the target object in the shot content of the second video stream obtained in step 102 from the shot content. There would be transparent areas without the target object in the second video stream after the target object is removed. Therefore, after the target object is removed, the electronic device performs image registration compensation on the areas at which the target object is located, so as to compensate the transparent areas without the target object, thereby obtaining the second intermediate video stream that does not include the target object. This ensures integrity of images in the second intermediate video stream and ensures that a composited target video has a good video effect. Optionally, the electronic device may remove the target object in the second video stream frame by frame.

In some optional embodiments of the present invention, the electronic device may perform object analysis on the shot content of the video stream, identify moving objects in the shot content, and then separate the moving objects or background objects other than the moving objects in the shot content, to facilitate extraction (or removal) of the target object. For example, the electronic device may separate the target object according to shape and color information of the moving objects. The separation herein refers to image matting performed by the electronic device on the identified target object, where the target object may be the moving objects or the background objects. In a process of separately identifying moving objects in the shot content, the electronic device may check the moving objects in sequence according to preset object priorities after identifying the moving objects. For example, human moving objects can be checked first, followed by animal moving objects and other moving objects. In addition, if the electronic device simultaneously identifies a plurality of moving objects in the shot content of the video stream, a separation action is performed for each moving object.

Optionally, the target object may be set as a moving object by default. In the case of a plurality of moving objects, to improve human-computer interaction experience, after separation of the moving objects from the shot content is completed, a user may perform selection according to his/her own needs from a plurality of moving objects automatically identified by the electronic device, determine a main object in the moving objects of the video stream, and implement secondary editing and determination on the target object to obtain the first intermediate video that includes the main object and the second intermediate video stream that does not include the main object, where the main object is a final target object. For example, to facilitate selection by the user, the electronic device may mark the identified and separated moving objects in the preview screens. For example, the electronic device outputs a video stream with brighter shot content in the first video stream and the second video stream to display as preview screens. In this case, the electronic device may replace background objects in the preview screens with background objects in the darker video stream and keep using the moving objects in the brighter video stream as the moving objects in the preview screens, so that the moving objects can be highlighted for the user to select. In a case that the electronic device receives a touch input on a main object in the plurality of moving objects in the preview screens, in response to the touch input, the electronic device extracts (or removes) the main object in the video stream, and undoes extraction (or removal) of objects other than the main object in the plurality of moving objects. For example, the electronic device identifies 3 human moving objects, and the user may perform a touch input operation on one human moving object to make the electronic device separate that human moving object, and automatically undo separation of the other two human moving objects.

In this embodiment of the present invention, considering that there is no location difference between the first video stream and the second video stream and the same matting actions are performed on the target object in the video streams in step 103 and step 104, in order to simplify identification of the target object to improve processing efficiency, identification and extraction (or removal) processing of the target object may be performed on one of the first video stream and the second video stream, and then removal (or extraction) processing may be performed on the other one of the first video stream and the second video stream at same locations. For example, to help the electronic device identify the target object, in a case that the shot content has different brightness in the first video stream and the second video stream, the electronic device may perform identification and extraction (or removal) processing on the target object in a video stream with brighter shot content in the first video stream and the second video stream, and perform removal (or extraction) processing on a video stream with darker shot content in the first video stream and the second video stream at the same locations. It can be understood that in a specific implementation, step 103 and step 104 may be performed simultaneously, or step 103 is performed before step 104, or step 104 is before step 103. The sequence of steps illustrated in FIG. 1 is only one implementation shown for convenience of visual understanding.

Step 105. Generate, based on the first intermediate video stream and the second intermediate video stream, a target video.

In this embodiment of the present invention, the first intermediate video stream and the second intermediate video stream are different in frame rate. In this case, the electronic device may perform, by using a registration algorithm, compositing on the first intermediate video stream and the second intermediate video stream which are different in frame rate to generate a target video, so that video special effects processing can be quickly implemented when videos are shot, allowing personalized video shooting and improving user shooting experience.

In this embodiment of the present invention, a first input is received; in response to the first input, a first video stream and a second video stream with a same shot content acquired by a camera module are obtained; a target object in the shot content is extracted from the first video stream and removed from the second video stream to obtain a first intermediate video stream and a second intermediate video stream respectively; and finally compositing is performed on the first intermediate video stream and the second intermediate video stream which are different in frame rate to generate a target video. In this way, video special effects processing can be quickly implemented when videos are shot, allowing personalized video shooting and improving user shooting experience.

Optionally, in some embodiments of the present invention, in step 104, the performing image registration compensation on the areas at which the target object is located may include: in target video frames with the target object removed, of the second video stream, performing image registration compensation on the areas at which the target object is located by using an image of a frame adjacent to the target video frame. This ensures integrity of images in the second intermediate video stream and ensures that a composited target video has a good video effect. For example, the electronic device may obtain an image of a previous frame and an image of a next frame of the target video frame, and perform image registration compensation on areas at which the target object is located according to areas in the image of the previous frame and the image of the next frame corresponding to the areas at which the target object in the target video frames is located.

In this embodiment of the present invention, to obtain the first intermediate video stream and the second intermediate video stream which are different in frame rate, the electronic device may first determine a video stream that requires frame rate adjustment in the first video stream and the second video stream. For example, based on requirement information about a fast and slow display effect for the target object and other objects except the target object in a target video to be generated, a video stream that requires frame rate adjustment in the first video stream and the second video stream is determined. In an example, to simplify user operations, the first input may include the requirement information about the fast and slow display effect. Then, if the first video stream is the video stream that requires frame rate adjustment, in step 103, frame rate adjustment processing is performed on the first video stream before the first intermediate video stream of the target object is obtained; and if the second video stream is the video stream that requires frame rate adjustment, in step 104, frame rate adjustment processing is performed on the second video stream before the second intermediate video stream is obtained. Alternatively, frame rate adjustment may be performed based on the first intermediate video stream and the second intermediate video stream after the first intermediate video stream and the second intermediate video stream are obtained.

For example, in some embodiments of the present invention, before step 105 of generating, based on the first intermediate video stream and the second intermediate video stream, a target video, the following step may be further included: performing frame rate adjustment processing on a to-be-processed video stream to obtain a processed video stream. In this way, the first intermediate video stream and the second intermediate video stream which are different in frame rate are obtained, making preparation for a user to obtain a personalized target video stream and improving user shooting experience. In this case, the electronic device may perform frame rate adjustment before extraction (or removal) processing of the target object in the video frames. If the to-be-processed video stream is the first video stream, step 103 of extracting a target object in the shot content of the first video stream to obtain a first intermediate video stream of the target object specifically includes extracting the target object in the shot content of the processed video stream to obtain a first intermediate video stream of the target object; alternatively, if the to-be-processed video stream is the second video stream, step 104 of removing the target object in the shot content of the second video stream and performing image registration compensation on areas at which the target object is located, to obtain a second intermediate video stream specifically includes removing the target object in the shot content of the processed video stream and performing image registration compensation on the areas at which the target object is located, to obtain a second intermediate video stream. Alternatively, the electronic device may perform frame rate adjustment after extraction (or removal) processing of the target object in the video frames. The to-be-processed video stream is at least one of the first intermediate video stream or the second intermediate video stream, and the target video is generated based on the processed video stream.

More preferably, in some embodiments of the present invention, the performing frame rate adjustment processing on a to-be-processed video stream to obtain a processed video stream may include one of the following manners.

Manner 1: In a case that when the camera module acquires images, an ambient brightness value is higher than a first preset brightness value and a gain value is lower than a first preset gain value, for the to-be-processed video stream, extract one frame of to-be-processed image from each first preset quantity of adjacent frames of images, and perform compositing on the to-be-processed images to obtain the processed video stream. In Manner 1, considering that when the camera module acquires images, the ambient brightness value is higher than the preset brightness value and the gain value is lower than the preset gain value, the video stream has relatively low image noise and a relatively good image effect. The electronic device can implement frame rate reduction adjustment on the to-be-processed video stream by using frame extraction and composition, which can not only ensure an image quality effect of the video stream, but also save compositing time and reduce power consumption. Herein, the first preset brightness value and the first preset gain value may be set according to historical experimental data, or may be set according to operational experiences, or may be set by a user. For example, the first preset gain value may be a 2× gain value; and the first preset quantity of frames may be determined based on frame rate adjustment requirements. For example, a frame rate of the to-be-processed video stream is 120 fps, and when the frame rate of the to-be-processed video stream needs to be reduced to 30 fps, the first preset quantity of frames is 4.

Manner 2: In a case that when the camera module acquires images, an ambient brightness value is lower than a second preset brightness value and a gain value is higher than a second preset gain value, for the to-be-processed video stream, perform averaging compositing on each second preset quantity of adjacent frames of images, and perform compositing on the averaging-composited images to obtain the processed video stream. In Manner 2, considering that when the camera module acquires images, the ambient brightness value is lower than the preset brightness value and the gain value is higher than the preset gain value, the video stream has relatively high image noise and a relatively poor image effect. The electronic device can implement frame rate reduction adjustment on the to-be-processed video stream by means of averaging compositing, which can ensure image quality performance in low light. Herein, the second preset brightness value and the second preset gain value may be set according to historical experimental data, or may be set according to operational experiences, or may be set by a user. For example, the second preset gain value may be a 2× gain value; and the second preset quantity of frames may be determined based on frame rate adjustment requirements. For example, a frame rate of the to-be-processed video stream is 120 fps, and when the frame rate of the to-be-processed video stream needs to be reduced to 30 fps, the second preset quantity of frames is 4. It can be understood that the second preset brightness value may be the same as or different from the first preset brightness value, and similarly, the second preset gain value may be the same as or different from the first preset gain value, which may be set according to actual design requirements.

Manner 3: Perform frame reduction processing on the to-be-processed video stream according to a correspondence between preset moving speeds and frame rates and based on a moving speed of a moving object in the to-be-processed video stream, to obtain the processed video stream. In Manner 3, considering real scenes in which images in the to-be-processed video stream are shot, frame rate reduction on the to-be-processed video stream may be implemented by determining moving speeds of a moving object and selecting different frame rates based on the moving speeds, which enables the frame rate adjustment operation to be adapted to the real scenes of the to-be-processed video stream, ensuring an image effect after the frame reduction. In addition, if the moving speed of the moving object in the to-be-processed video stream is greater than a preset value, to prevent smearing and foreground from moving too fast, the frame rate of the to-be-processed video stream including the moving object can be adjusted to be smaller than an original frame rate of the to-be-processed video stream. For example, if the frame rate of the to-be-processed video stream is 120 fps and the moving speed of the moving object in the to-be-processed video stream is greater than the preset value, the electronic device may adjust the frame rate of the to-be-processed video stream to a value smaller than 120 fps, for example, 60 fps or 40 fps.

Manner 4: For the to-be-processed video stream, perform, based on adjacent images, frame addition processing every third preset quantity of frames of images to obtain the processed video stream. In Manner 4, the electronic device may also implement frame rate increase adjustment of the to-be-processed video stream by means of frame addition processing.

In the image shooting method provided in this embodiment of the present invention, a first input is received; in response to the first input, a first video stream and a second video stream with a same shot content acquired by a camera module are obtained; a target object in the shot content is extracted from the first video stream and removed from the second video stream to obtain a first intermediate video stream and a second intermediate video stream respectively; and finally compositing is performed on the first intermediate video stream and the second intermediate video stream which are different in frame rate to generate a target video. In this way, video special effects processing can be quickly implemented when videos are shot, allowing personalized video shooting and improving user shooting experience.

Based on the foregoing method, an embodiment of the present invention provides an electronic device for implementing the foregoing method.

Figure 2:
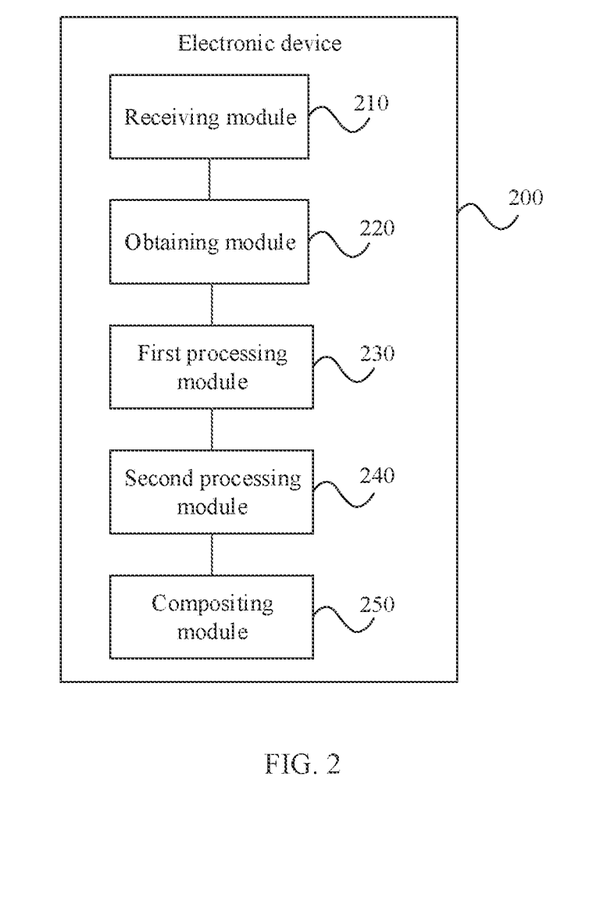
FIG. 2 is a schematic structural diagram of an electronic device according to an embodiment of the present invention.

FIG. 2 is a schematic structural diagram of an electronic device according to an embodiment of the present invention. This embodiment of the present invention provides an electronic device 200, which may include a receiving module 210, an obtaining module 220, a first processing module 230, a second processing module 240, and a compositing module 250.

The receiving module 210 is configured to receive a first input.

The obtaining module 220 is configured to: in response to the first input, obtain a first video stream and a second video stream with a same shot content acquired by a camera module.

The first processing module 230 is configured to extract a target object in the shot content of the first video stream to obtain a first intermediate video stream of the target object.

The second processing module 240 is configured to remove the target object in the shot content of the second video stream and perform image registration compensation on areas at which the target object is located, to obtain a second intermediate video stream.

The compositing module 250 is configured to generate, based on the first intermediate video stream and the second intermediate video stream, a target video.

The first intermediate video stream and the second intermediate video stream are different in frame rate.

Optionally, in some embodiments of the present invention, the second processing module 240 may include a registration compensation unit.

The registration compensation unit is configured to: in target video frames with the target object removed, of the second video stream, perform image registration compensation on areas at which the target object is located by using an image of a frame adjacent to the target video frame.

Optionally, in some embodiments of the present invention, the electronic device 200 may further include a third processing module, where a to-be-processed video stream may be the first video stream, and the first processing module 230 may specifically include a first processing unit; or the to-be-processed video stream may be the second video stream, and the second processing module 240 may specifically include a second processing unit; or the to-be-processed video stream is at least one of the first intermediate video stream or the second intermediate video stream, and the target video is generated based on a processed video stream.

The third processing module is configured to perform frame rate adjustment processing on a to-be-processed video stream to obtain a processed video stream.

The first processing unit is configured to extract the target object in the shot content of the processed video stream to obtain a first intermediate video stream of the target object.

The second processing unit is configured to remove the target object in the shot content of the processed video stream and perform image registration compensation on areas at which the target object is located, to obtain a second intermediate video stream.

Optionally, in some embodiments of the present invention, the third processing module may include one of the following: the third processing unit, a fourth processing unit, a fifth processing unit, and a sixth processing unit.

The third processing unit is configured to: in a case that when the camera module acquires images, an ambient brightness value is higher than a first preset brightness value and a gain value is lower than a first preset gain value, for the to-be-processed video stream, extract one frame of to-be-processed image from each first preset quantity of adjacent frames of images, and perform compositing on the to-be-processed images to obtain the processed video stream.

The fourth processing unit is configured to: in a case that when the camera module acquires images, an ambient brightness value is lower than a second preset brightness value and a gain value is higher than a second preset gain value, for the to-be-processed video stream, perform averaging compositing on each second preset quantity of adjacent frames of images, and perform compositing on the averaging-composited images to obtain the processed video stream.

The fifth processing unit is configured to: according to a preset correspondence between moving speeds and frame rates and based on a moving speed of a moving object in the to-be-processed video stream, perform frame reduction processing on the to-be-processed video stream to obtain the processed video stream.

The sixth processing unit is configured to: for the to-be-processed video stream, perform, based on adjacent images, frame addition processing every third preset quantity of frames of images to obtain the processed video stream.

More preferably, in some embodiments of the present invention, the shot content has different brightness in the first video stream and the second video stream, helping better highlight the target object in a generated target video. The shot content corresponds to a same camera site and a same exposure time in the first video stream and the second video stream, helping reduce difference between the two video streams to achieve a better video effect.

The electronic device 200 provided in this embodiment of the present invention is capable of implementing processes that are implemented by the electronic device in the method embodiments of FIG. 1. To avoid repetition, details are not described herein again.

According to the electronic device provided in this embodiment of the present invention, by using the receiving module and the obtaining module, a first input is received, and in response to the first input, a first video stream and a second video stream with a same shot content acquired by a camera module are obtained; by using the first processing module and the second processing module, a target object in the shot content is extracted from the first video stream and removed from the second video stream to obtain a first intermediate video stream and a second intermediate video stream respectively; and finally by using the compositing module, compositing is performed on the first intermediate video stream and the second intermediate video stream which are different in frame rate to generate a target video. In this way, video special effects processing can be quickly implemented when videos are shot, allowing personalized video shooting and improving user shooting experience.

Figure 3:
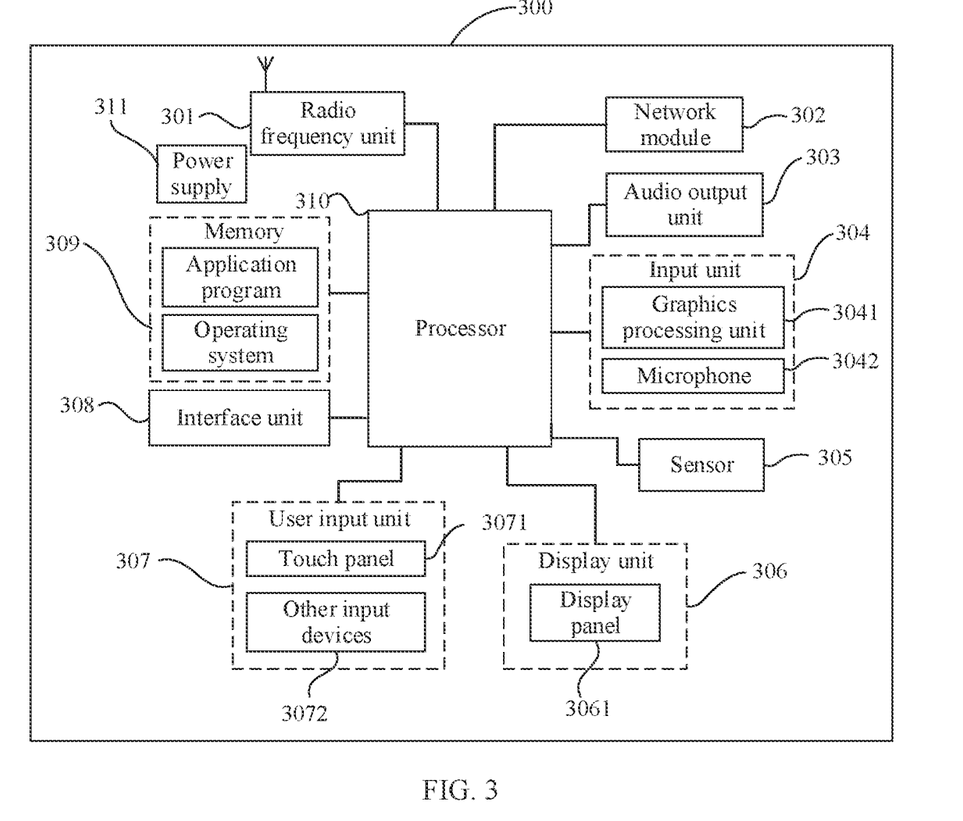
FIG. 3 is a schematic diagram of a hardware structure of an electronic device according to an embodiment of the present invention.

FIG. 3 is a schematic diagram of a hardware structure of an electronic device for implementing the embodiments of the present invention.

The electronic device 300 includes but is not limited to components such as a radio frequency unit 301, a network module 302, an audio output unit 303, an input unit 304, a sensor 305, a display unit 306, a user input unit 307, an interface unit 308, a memory 309, a processor 310, and a power supply 311. A person skilled in the art may understand that the structure of the electronic device shown in FIG. 3 does not constitute a limitation on the electronic device. The electronic device may include more or fewer components than those shown in the figure, or combine some of the components, or arrange the components differently. In this embodiment of the present invention, the electronic device includes but is not limited to a mobile phone, a tablet computer, a notebook computer, a palmtop computer, a vehicle-mounted terminal, a wearable device, and a pedometer.

The user input unit 307 is configured to receive a first input. The processor 310 is configured to: in response to the first input, obtain a first video stream and a second video stream with a same shot content acquired by a camera module; extract a target object in the shot content of the first video stream to obtain a first intermediate video stream of the target object; remove the target object in the shot content of the second video stream and perform image registration compensation on areas at which the target object is located, to obtain a second intermediate video stream; and generate, based on the first intermediate video stream and the second intermediate video stream, a target video; where the first intermediate video stream and the second intermediate video stream are different in frame rate. In this way, personalized video shooting can be realized, and user shooting experience can be improved.

It should be understood that in this embodiment of the present invention, the radio frequency unit 301 may be configured to receive and transmit signals in an information receiving/transmitting or a call process; and specifically, after receiving downlink data from a base station, the radio frequency unit 301 transmits the downlink data to the processor 310 for processing, and in addition, transmits uplink data to the base station. Generally, the radio frequency unit 301 includes but is not limited to an antenna, at least one amplifier, a transceiver, a coupler, a low noise amplifier, and a duplexer. In addition, the radio frequency unit 301 may further communicate with a network and another device through a wireless communications system.

The electronic device provides a user with wireless broadband internet access through the network module 302, for example, helping the user to send or receive an email, to browse a web page, or to access streaming media.

The audio output unit 303 may convert audio data received by the radio frequency unit 301 or the network module 302 or stored in the memory 309 into an audio signal and output the audio signal as a sound. In addition, the audio output unit 303 may further provide audio output (for example, a call signal received sound or a message received sound) related to a specific function performed by the electronic device 300. The audio output unit 303 includes a speaker, a buzzer, a telephone receiver, and the like.

The input unit 304 is configured to receive audio or video signals. The input unit 304 may include a graphics processing unit (GPU) 3041 and a microphone 3042. The graphics processing unit 3041 processes image data of a static picture or a video that is obtained by an image capture apparatus (for example, a camera) in a video capture mode or an image capture mode. A processed image frame may be displayed on the display unit 306. The image frame processed by the graphics processing unit 3041 may be stored in the memory 309 (or another storage medium) or transmitted by using the radio frequency unit 301 or the network module 302. The microphone 3042 is capable of receiving sounds and processing such sounds into audio data. The processed audio data can be converted in a telephone call mode into a format that can be transmitted by the radio frequency unit 301 to a mobile communication base station, for outputting.

The electronic device 300 further includes at least one sensor 305, for example, an optical sensor, a motion sensor, and other sensors. Specifically, the optical sensor includes an ambient light sensor and a proximity sensor. The ambient light sensor may adjust brightness of a display panel 3061 based on intensity of ambient light, and the proximity sensor may turn off the display panel 3061 and/or backlight when the electronic device 300 moves close to an ear. As a type of motion sensor, an accelerometer sensor can detect magnitudes of accelerations in all directions (usually three axes), can detect a magnitude and a direction of gravity when in a static state, and can be applied to posture recognition (such as screen switching between portrait and landscape, related games, and magnetometer posture calibration) of the electronic device, functions related to vibration recognition (such as a pedometer and tapping), and the like. The sensor 305 may also include a fingerprint sensor, a pressure sensor, an iris sensor, a molecular sensor, a gyroscope, a barometer, a hygrometer, a thermometer, an infrared sensor, and the like. Details are not described herein.

The display unit 306 is configured to display information input by the user or information provided for the user. The display unit 306 may include the display panel 3061, and the display panel 3061 may be configured in a form of a liquid crystal display (LCD), an organic light-emitting diode (OLED), or the like.

The user input unit 307 may be configured to: receive input digit or character information and generate key signal input related to user settings and function control of the electronic device. Specifically, the user input unit 307 includes a touch panel 3071 and other input devices 3072. The touch panel 3071, which is also referred to as a touchscreen, may capture a touch operation performed by a user on or near the touch panel 3071 (for example, an operation performed by the user on the touch panel 3071 or near the touch panel 3071 by using any appropriate object or accessory such as a finger or a stylus). The touch panel 3071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touch point coordinates, transmits the touch point coordinates to the processor 310, and receives and executes a command transmitted by the processor 310. In addition, the touch panel 3071 may be implemented in a plurality of forms, for example, as a resistive, capacitive, infrared, or surface acoustic wave touch panel. In addition to the touch panel 3071, the user input unit 307 may further include other input devices 3072. Specifically, the other input devices 3072 may include but are not limited to a physical keyboard, a function button (such as a volume control button or a power on/off button), a trackball, a mouse, and a joystick. Details are not described herein.

Further, the touch panel 3071 may cover the display panel 3061. When detecting a touch operation on or near the touch panel 3071, the touch panel 3071 transmits the touch operation to the processor 310 to determine a type of a touch event. Then, the processor 310 provides a corresponding visual output on the display panel 3061 based on the type of the touch event. Although in FIG. 3, the touch panel 3071 and the display panel 3061 act as two independent components to implement input and output functions of the electronic device, in some embodiments, the touch panel 3071 and the display panel 3061 may be integrated to implement the input and output functions of the electronic device. This is not specifically limited herein.

The interface unit 308 is an interface for connecting an external apparatus to the electronic device 300. For example, the external apparatus may include a wired or wireless headphone port, an external power supply (or battery charger) port, a wired or wireless data port, a memory card port, a port for connecting an apparatus provided with an identification module, an audio input/output (I/O) port, a video I/O port, an earphone port, and the like. The interface unit 308 may be configured to receive an input (for example, data information and power) from an external apparatus, and transmit the received input to one or more elements in the electronic device 300, or may be configured to transmit data between the electronic device 300 and the external apparatus.

The memory 309 may be configured to store software programs and various data. The memory 309 may mainly include a program storage area and a data storage area. The program storage area may store an operating system, an application program required by at least one function (such as a sound play function and an image play function), and the like. The data storage area may store data (such as audio data and a phone book) created based on use of the mobile phone. In addition, the memory 309 may include a high-speed random access memory, and may further include a non-volatile memory such as at least one disk storage device, a flash memory device, or another volatile solid-state storage device.

The processor 310 is a control center of the electronic device, uses various interfaces and lines to connect all parts of the entire electronic device, and performs various functions and data processing of the electronic device by running or executing the software program and/or module stored in the memory 309 and invoking data stored in the memory 309, thereby performing overall monitoring on the electronic device. The processor 310 may include one or more processing units. Preferably, the processor 310 may integrate an application processor and a modem processor. The application processor mainly processes an operating system, a user interface, an application program, and the like. The modem processor mainly processes wireless communication. It can be understood that the modem processor may alternatively not be integrated in the processor 310.

The electronic device 300 may further include the power supply 311 (such as a battery) that supplies power to the components. Preferably, the power supply 311 may be logically connected to the processor 310 by using a power management system, so as to implement functions such as charge management, discharge management, and power consumption management are implemented by using the power management system.

In addition, the electronic device 300 includes some functional modules that are not shown. Details are not described herein.

Preferably, an embodiment of the present invention further provides an electronic device, including a processor 310, a memory 309, and a computer program stored in the memory 309 and capable of running on the processor 310. When the computer program is executed by the processor 310, the processes of the foregoing embodiments of the image shooting method are implemented, with the same technical effects achieved. To avoid repetition, details are not described herein again.

An embodiment of the present invention further provides a computer-readable storage medium, where the computer-readable storage medium stores a computer program. When the computer program is executed by a processor, the processes of the foregoing embodiments of the image shooting method are implemented, with the same technical effects achieved. To avoid repetition, details are not described herein again. For example, the computer-readable storage medium is a read-only memory (ROM), a random access memory (RAM), a magnetic disk, or an optical disk.

It should be noted that the terms "comprise", "include", or any of their variants in this specification are intended to cover a non-exclusive inclusion, such that a process, a method, an article, or an apparatus that includes a list of elements includes not only those elements but also other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

A person of ordinary skill in the art may realize that units and algorithm steps of various examples described with reference to the embodiments disclosed in this specification can be implemented by using electronic hardware or a combination of a computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of the present invention.

A person of ordinary skill in the art may understand that all or some of the processes of the methods in the embodiments may be implemented by a computer program controlling relevant hardware. The program may be stored in a computer-readable storage medium. When the program runs, the processes of the methods in the embodiments are performed. The foregoing storage medium may be a magnetic disk, an optical disc, a read-only memory (ROM), a random access memory (RAM), or the like.

It may be understood that the embodiments described in the embodiments of the present disclosure may be implemented by hardware, software, firmware, middleware, microcode, or a combination thereof. For hardware implementation, modules, units, and subunits may be implemented in one or more application-specific integrated circuits (ASIC), digital signal processors (DSP), digital signal processing devices (DSPD), programmable logic devices (PLD), field-programmable gate arrays (FPGA), general-purpose processors, controllers, microcontrollers, microprocessors, and other electronic units for performing the functions described in this disclosure, or a combination thereof.

For software implementation, the technologies described in the embodiments of this disclosure may be implemented by modules (for example, procedures or functions) that perform the functions described in the embodiments of this disclosure. Software code may be stored in the memory and executed by the processor. The memory may be implemented in or outside the processor.

The embodiments of the present invention are described above with reference to the accompanying drawings, but the present invention is not limited to the foregoing implementations. The foregoing implementations are only illustrative rather than restrictive. Inspired by the present invention, a person of ordinary skill in the art can still derive many variations without departing from the essence of the present invention and the protection scope of the claims. All these variations shall fall within the protection of the present invention.

What is claimed is:

1. An image shooting method, performed by an electronic device and comprising:
   receiving a first input;
   in response to the first input, obtaining a first video stream and a second video stream with a same shot content acquired by a camera module;
   extracting a target object in the shot content of the first video stream to obtain a first intermediate video stream of the target object;
   removing the target object in the shot content of the second video stream and performing image registration compensation on areas at which the target object is located, to obtain a second intermediate video stream; and
   generating, based on the first intermediate video stream and the second intermediate video stream, a target video; wherein
   the first intermediate video stream and the second intermediate video stream are different in frame rate;
   wherein before the generating, based on the first intermediate video stream and the second intermediate video stream, a target video, the method further comprises:
   performing frame rate adjustment processing on a to-be-processed video stream to obtain a processed video stream; wherein
   the to-be-processed video stream is the first video stream, and the extracting a target object in the shot content of the first video stream to obtain a first intermediate video stream of the target object specifically comprises:
   extracting the target object in the shot content of the processed video stream to obtain a first intermediate video stream of the target object; or
   the to-be-processed video stream is the second video stream, and the removing the target object in the shot content of the second video stream and performing image registration compensation on areas at which the target object is located, to obtain a second intermediate video stream specifically comprises:
   removing the target object in the shot content of the processed video stream and performing image registration compensation on the areas at which the target object is located, to obtain a second intermediate video stream; or the to-be-processed video stream is at least one of the first intermediate video stream or the second intermediate video stream, and the target video is generated based on the processed video stream;

wherein the performing frame rate adjustment processing on a to-be-processed video stream to obtain a processed video stream comprises one of the following:

in a case that when the camera module acquires images, an ambient brightness value is higher than a first preset brightness value and a gain value is lower than a first preset gain value, for the to-be-processed video stream, extracting one frame of to-be-processed image from each first preset quantity of adjacent frames of images, and performing compositing on the to-be-processed images to obtain the processed video stream;

in a case that when the camera module acquires images, an ambient brightness value is lower than a second preset brightness value and a gain value is higher than a second preset gain value, for the to-be-processed video stream, performing averaging compositing on each second preset quantity of adjacent frames of images, and performing compositing on the averaging-composited images to obtain the processed video stream;

according to a preset correspondence between moving speeds and frame rates and based on a moving speed of a moving object in the to-be-processed video stream, performing frame reduction processing on the to-be-processed video stream to obtain the processed video stream; and for the to-be-processed video stream, performing, based on adjacent images, frame addition processing every third preset quantity of frames of images to obtain the processed video stream.

2. The method according to claim 1, wherein the performing image registration compensation on areas at which the target object is located comprises:

in target video frames with the target object removed, of the second video stream, performing image registration compensation on the areas at which the target object is located by using an image of a frame adjacent to the target video frame.

3. The method according to claim 1, wherein the shot content has different brightness in the first video stream and the second video stream, and corresponds to a same camera site and a same exposure time in the first video stream and the second video stream.

4. An electronic device, comprising: a processor, a memory, and a program stored in the memory and capable of running on the processor, wherein when executed the program, the processor is configured to:

receive a first input;

in response to the first input, obtain a first video stream and a second video stream with a same shot content acquired by a camera module;

extract a target object in the shot content of the first video stream to obtain a first intermediate video stream of the target object;

remove the target object in the shot content of the second video stream and perform image registration compensation on areas at which the target object is located, to obtain a second intermediate video stream; and generate, based on the first intermediate video stream and the second intermediate video stream, a target video; wherein the first intermediate video stream and the second intermediate video stream are different in frame rate;

wherein the processor is further configured to: perform frame rate adjustment processing on a to-be-processed video stream to obtain a processed video stream; wherein:

the to-be-processed video stream is the first video stream, and the processor is configured to: extract the target object in the shot content of the processed video stream to obtain a first intermediate video stream of the target object; or the to-be-processed video stream is the second video stream, and the processor is configured to: remove the target object in the shot content of the processed video stream and perform image registration compensation on areas at which the target object is located, to obtain a second intermediate video stream; or the to-be-processed video stream is at least one of the first intermediate video stream or the second intermediate video stream, and the target video is generated based on the processed video stream;

wherein the processor is further configured to perform one of the following:

in a case that when the camera module acquires images, an ambient brightness value is higher than a first preset brightness value and a gain value is lower than a first preset gain value, for the to-be-processed video stream, extract one frame of to-be-processed image from each first preset quantity of adjacent frames of images, and perform compositing on the to-be-processed images to obtain a processed video stream;

in a case that when the camera module acquires images, an ambient brightness value is lower than a second preset brightness value and a gain value is higher than a second preset gain value, for the to-be-processed video stream, perform averaging compositing on each second preset quantity of adjacent frames of images, and perform compositing on the averaging-composited images to obtain a processed video stream;

according to a preset correspondence between moving speeds and frame rates and based on a moving speed of a moving object in the to-be-processed video stream, perform frame reduction processing on the to-be-processed video stream to obtain a processed video stream; and for the to-be-processed video stream, perform, based on adjacent images, frame addition processing every third preset quantity of frames of images to obtain a processed video stream.

5. The electronic device according to claim 4, wherein the processor is further configured to:

in target video frames with the target object removed, of the second video stream, perform image registration compensation on the areas at which the target object is located by using an image of a frame adjacent to the target video frame.

6. The electronic device according to claim 4, wherein the shot content has different brightness in the first video stream and the second video stream, and corresponds to a same camera site and a same exposure time in the first video stream and the second video stream.

7. A non-transitory computer-readable storage medium, wherein the computer-readable storage medium stores a computer program, and the computer program, when executed by a processor, causes the processor to execute the following steps:
receiving a first input;
in response to the first input, obtaining a first video stream and a second video stream with a same shot content acquired by a camera module;
extracting a target object in the shot content of the first video stream to obtain a first intermediate video stream of the target object;
removing the target object in the shot content of the second video stream and performing image registration compensation on areas at which the target object is located, to obtain a second intermediate video stream; and
generating, based on the first intermediate video stream and the second intermediate video stream, a target video; wherein
the first intermediate video stream and the second intermediate video stream are different in frame rate;
wherein before the generating, based on the first intermediate video stream and the second intermediate video stream, a target video, the program causes the processor to perform frame rate adjustment processing on a to-be-processed video stream to obtain a processed video stream; wherein
the to-be-processed video stream is the first video stream, and the extracting a target object in the shot content of the first video stream to obtain a first intermediate video stream of the target object specifically comprises: extracting the target object in the shot content of the processed video stream to obtain a first intermediate video stream of the target object; or
the to-be-processed video stream is the second video stream, and the removing the target object in the shot content of the second video stream and performing image registration compensation on areas at which the target object is located, to obtain a second intermediate video stream specifically comprises: removing the target object in the shot content of the processed video stream and performing image registration compensation on the areas at which the target object is located, to obtain a second intermediate video stream; or
the to-be-processed video stream is at least one of the first intermediate video stream or the second intermediate video stream, and the target video is generated based on the processed video stream;
wherein the performing frame rate adjustment processing on a to-be-processed video stream to obtain a processed video stream comprises one of the following:
in a case that when the camera module acquires images, an ambient brightness value is higher than a first preset brightness value and a gain value is lower than a first preset gain value, for the to-be-processed video stream, extracting one frame of to-be-processed image from each first preset quantity of adjacent frames of images, and performing compositing on the to-be-processed images to obtain the processed video stream;
in a case that when the camera module acquires images, an ambient brightness value is lower than a second preset brightness value and a gain value is higher than a second preset gain value, for the to-be-processed video stream, performing averaging compositing on each second preset quantity of adjacent frames of images, and performing compositing on the averaging-composited images to obtain the processed video stream;
according to a preset correspondence between moving speeds and frame rates and based on a moving speed of a moving object in the to-be-processed video stream, performing frame reduction processing on the to-be-processed video stream to obtain the processed video stream; and
for the to-be-processed video stream, performing, based on adjacent images, frame addition processing every third preset quantity of frames of images to obtain the processed video stream.

8. The non-transitory computer-readable storage medium according to claim 7, wherein the performing image registration compensation on areas at which the target object is located comprises:
in target video frames with the target object removed, of the second video stream, performing image registration compensation on the areas at which the target object is located by using an image of a frame adjacent to the target video frame.

9. The non-transitory computer-readable storage medium according to claim 7, wherein the shot content has different brightness in the first video stream and the second video stream, and corresponds to a same camera site and a same exposure time in the first video stream and the second video stream.

* * * * *